(12) United States Patent
Muramatsu et al.

(10) Patent No.: US 7,230,899 B2
(45) Date of Patent: Jun. 12, 2007

(54) REWRITABLE TYPE OPTICAL DISC INCLUDING RECORDING MARKS OVER BREAK PORTIONS OF RECORDING TRACKS, MANUFACTURING METHOD AND MANUFACTURING SYSTEM THEREFOR

(75) Inventors: Eiji Muramatsu, Tokorozawa (JP); Toshihiko Takishita, Yamanashi-ken (JP); Masahiro Kato, Tokorozawa (JP); Yoshio Sasaki, Tokorozawa (JP); Haruyasu Sakata, Tokorozawa (JP)

(73) Assignee: Pioneer Corporation, Tokyo-To (JP)

( * ) Notice: Subject to any disclaimer, the term of this patent is extended or adjusted under 35 U.S.C. 154(b) by 252 days.

(21) Appl. No.: 09/984,595

(22) Filed: Oct. 30, 2001

(65) Prior Publication Data

US 2002/0051417 A1 May 2, 2002

(30) Foreign Application Priority Data

Nov. 1, 2000 (JP) ............................. 2000-334967

(51) Int. Cl.
*G11B 7/007* (2006.01)
(52) U.S. Cl. ............................... 369/53.21; 369/275.3; 369/275.4; 369/59.25
(58) Field of Classification Search ............. 369/275.3, 369/275.4, 53.21, 59.25
See application file for complete search history.

(56) References Cited

U.S. PATENT DOCUMENTS

| | | | |
|---|---|---|---|
| 4,744,074 A | 5/1988 | Imanaka et al. ............. 369/278 |
| 5,878,024 A * | 3/1999 | Kobayashi et al. ....... 369/275.3 |
| 5,923,640 A * | 7/1999 | Takemura et al. ........ 369/275.3 |
| 6,120,870 A | 9/2000 | Nebashi et al. |
| 6,224,959 B1 * | 5/2001 | Nagasaka et al. .......... 428/64.1 |
| 6,256,266 B1 * | 7/2001 | Mitani ..................... 369/275.4 |
| 6,307,824 B1 * | 10/2001 | Kuroda et al. ........... 369/53.11 |
| 6,504,800 B1 * | 1/2003 | Kuwahara et al. ....... 369/275.3 |
| 6,599,607 B1 * | 7/2003 | Takishita et al. .......... 428/64.4 |
| 6,633,534 B1 * | 10/2003 | Tosaki et al. ............. 369/275.3 |
| 6,687,213 B1 * | 2/2004 | Takishita et al. ........ 369/275.4 |
| 2002/0048246 A1 * | 4/2002 | Yamaguchi et al. ..... 369/59.25 |

FOREIGN PATENT DOCUMENTS

| | | |
|---|---|---|
| CN | 1154174 A | 7/1997 |
| EP | 1 065 659 A2 | 1/2001 |
| EP | 1 117 095 A2 | 7/2001 |
| EP | 1 170 733 A2 | 1/2002 |
| JP | 11-224441 | 8/1999 |
| JP | 2000-20959 | 1/2000 |
| WO | WO00/07182 | 2/2000 |

* cited by examiner

*Primary Examiner*—Andrea Wellington
*Assistant Examiner*—Michael V. Battaglia
(74) *Attorney, Agent, or Firm*—Drinker Biddle & Reath LLP

(57) ABSTRACT

A rewritable type optical disc includes recording tracks formed with break portions; and recording marks corresponding to predetermined data and formed on the recording tracks. The recording marks are formed over the break portions on the recording tracks. If the predetermined data, such as control data, recorded as the recording mark is illegally altered, the position of the recording marks are changed and some break portions are not covered by the recording marks. Since the return light level of the break portion, which is not covered by the recording mark, is different from the return light level of the break portion covered by the recording mark, such illegal alteration of the predetermined data such as the control data may be detected.

14 Claims, 8 Drawing Sheets

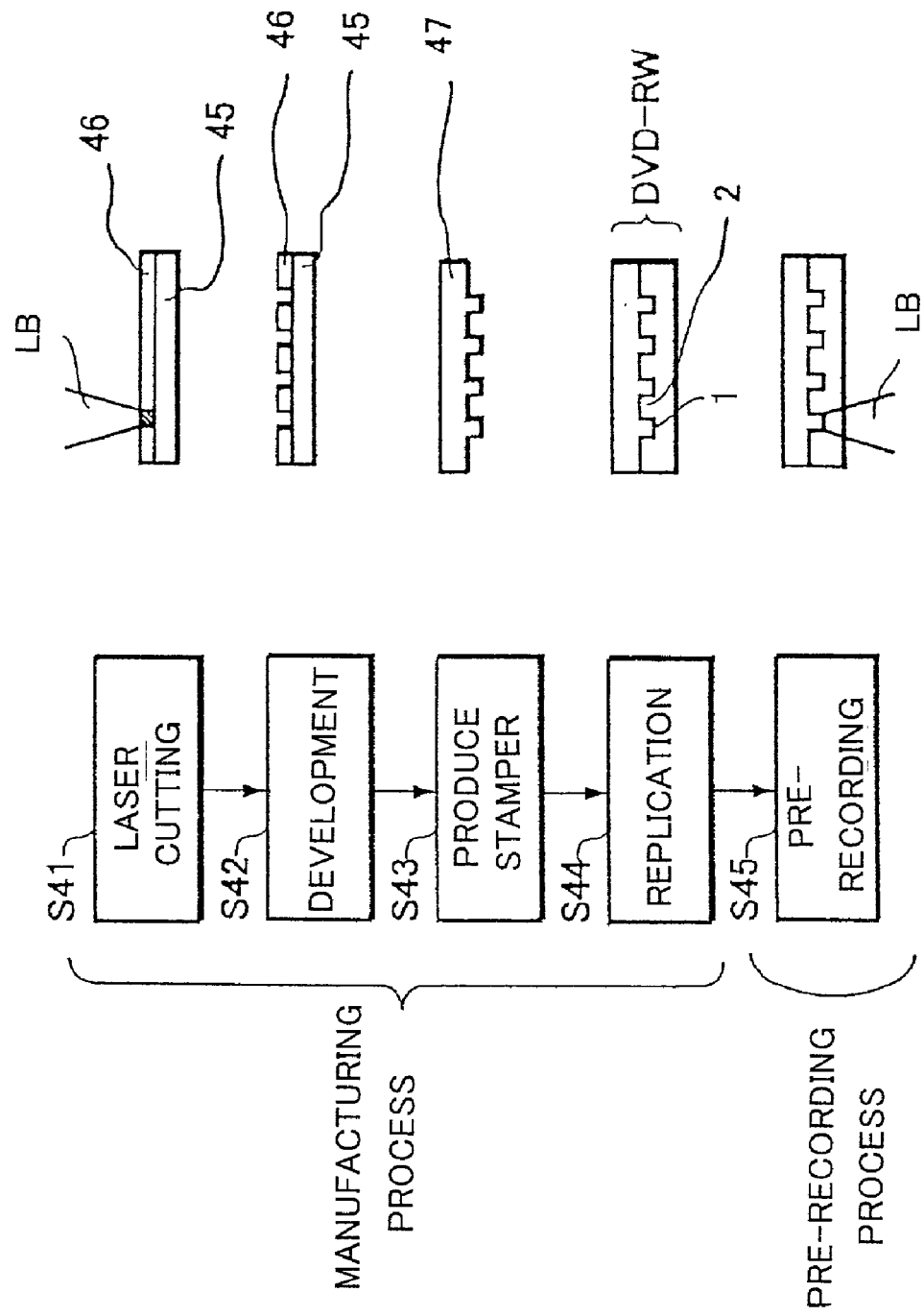

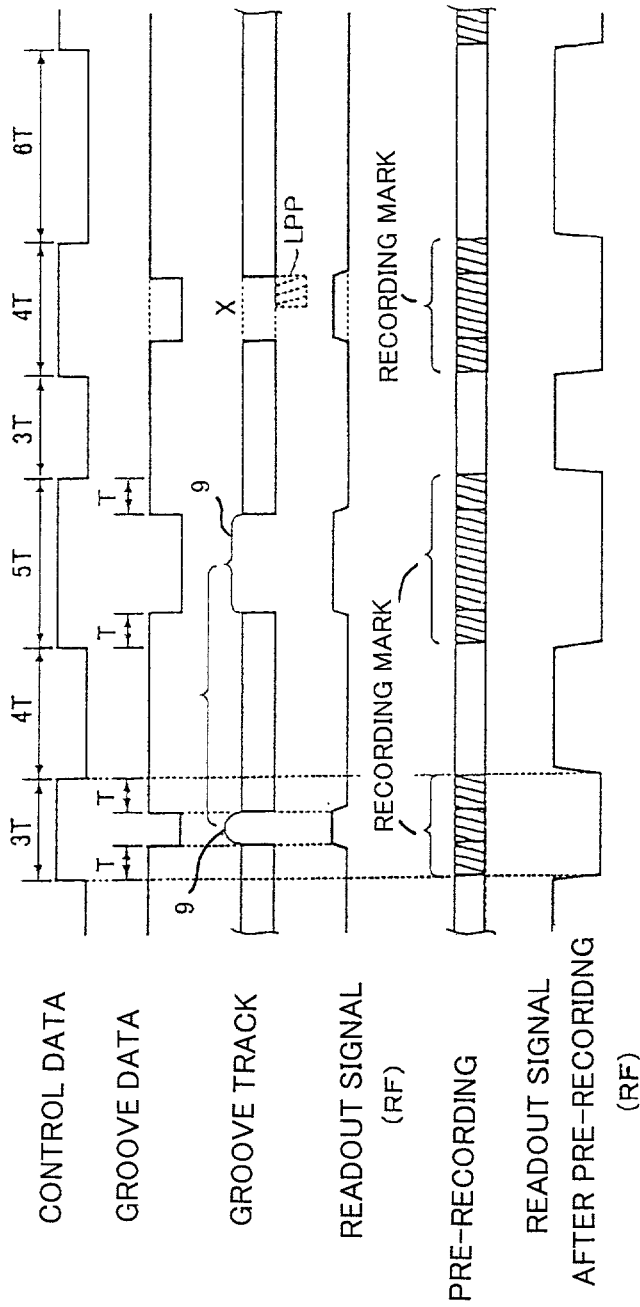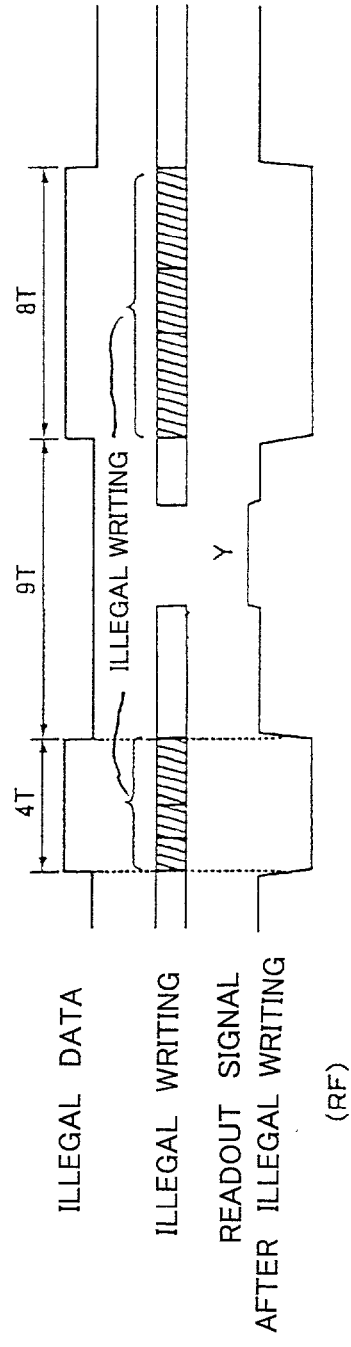
FIG. 5A
FIG. 5B

REWRITABLE TYPE OPTICAL DISC INCLUDING RECORDING MARKS OVER BREAK PORTIONS OF RECORDING TRACKS, MANUFACTURING METHOD AND MANUFACTURING SYSTEM THEREFOR

BACKGROUND OF THE INVENTION

1. Field of the Invention

This invention relates to a rewritable type optical disc such as DVD-RW, a manufacturing method and a manufacturing system of such an optical disc.

2. Description of Related Art

Since a variety of CD-ROM formats have been proposed and DVD (Digital Versatile Disk) has been developed, there are various types of optical disks, and the number of the type of the optical disks is still increasing. At present, the CD-ROM formats for read-only type CD-ROM and rewritable type CD-ROM have been proposed, and there are various DVD formats for read-only type DVD-Video, rewritable type DVD-RW which can be rewritable for limited times, and DVD-RAM which can be readable and writable for unlimited times.

In order to avoid the illegal copy of contents recorded on the read-only type DVD-Video to a DVD-RW in a bit-by-bit manner, a DVD-RW in conformity with the DVD-RW version 1.0 standard, currently on the market, has embossed pits formed in the control data zone. Those embossed pits are called as unreadable emboss and have the same depth as the grooves. By forming the embossed pits in the control data zone, reading out the data illegally recorded in the control data zone of the DVD-RW is prevented.

The above-mentioned measure to prevent the illegal copy has such a problem that the embossed pits put the adverse affects on the reproduction of the DVD-RW. In this view, in a DVD-RW in conformity with the next DVD-RW version 1.1 standard, the control data is recorded as embossed pits having depths deeper than the groove tracks, and the control data zone is formed as the read-only area.

However, when deep embossed pits are formed, the groove tracks must be formed on the original optical disk 80 by exposing the resist layer to its intermediate depth by a weak light beam B as shown in FIG. 8A. The bottom shape of the grove track of the DVD-RW thus formed is not necessarily flat, and hence there is a basic problem that desired recording/reproduction characteristics cannot be achieved.

In FIGS. 8A, 8B and 8C, the light beam for forming the embossed pits is shown as the light beam A and the light beam for forming the groove tracks is shown as the light beam B. FIG. 8A shows the exposing state of the original recording disc in a sectional view. FIG. 8B shows the sectional view of the DVD-RW after the development, and FIG. 8C shows the sectional view of the DVD-RW manufactured from the developed original recording disc. FIGS. 8A to 8C are shown to illustrate the bottom shape of the DVD-RW in each phase. In FIG. 8C, the multi-layer 84, the reflective layer 85, the adhesive layer 86 and the protection layer 87 are formed on the transparent substrate 81 in this order. As seen, the deep embossed pit 82 formed on the transparent substrate 81 of the DVD-RW has a relatively flat bottom shape. In comparison, the bottom shape of the groove track 83 formed on the transparent substrate 81 is not flat, resulting in the degradation of the groove shape.

SUMMARY OF THE INVENTION

It is an object of the present invention to provide a rewritable type optical disc from which control data can be read out without the degradation of the recording/reproduction characteristics of the groove tracks, by avoiding the undesired deformation of the groove shape due to the formation of deep embossed pits.

According to one aspect of the present invention, there is provided a rewritable type optical disc including: recording tracks formed with break portions; and recording marks corresponding to predetermined data and formed on the recording tracks, wherein the recording marks are formed over the break portions on the recording tracks.

In accordance with the optical disc thus configured, the break portion is formed on the recording track as a discontinuous portion of the recording tracks. The recording marks are formed over the break portions. If light beam is irradiated on the break portion on which the recording mark is not formed, the return light from the break portion has a different level than the return light from the other portions. On the other hand, if the recording mark is formed over the break portion, the return light from the break portion has the same level as the return light from the other portions. In a recordable type optical disc of the present invention, the break portions are covered by the recording marks. If the predetermined data, such as control data, recorded as the recording mark is illegally altered, the position of the recording marks are changed and some break portions are not covered by the recording marks. Since the return light level of the break portion, which is not covered by the recording mark, is different from the return light level of the break portion covered by the recording mark, such illegal alteration of the predetermined data such as the control data may be detected.

Preferably, the rewritable type optical disc may further include pre-pits formed between neighboring recording tracks and indicating an address position on the optical disc, and the break portions are not formed on the recording tracks at positions where reading out the pre-pit is affected by the break portion. Thus, if reading out the pre-pits is affected by the existence of the break portion, the break portion is not formed at such position.

In one example, the break portions are not formed on the recording tracks at positions where the break portion is in alignment with the pre-pit in a radial direction of the optical disc. In other example, the break portions are not formed on the recording tracks at positions where the break portion and the pre-pit are close to each other within a range of a light beam spot used for reading out data from the optical disc.

In a preferred embodiment, the predetermined data may be control data to be recorded in a control data zone of the optical disc, and the break portions are formed on the recording tracks only in the control data zone. Thus, the illegal alteration of the control data, generally including important data such as copyright protection information and the like, may be protected, and hence the illegal copy of contents from a read-only type optical disc such as DVD-Video to a rewritable type disc such as DVD-RW may be avoided.

According to another aspect of the present invention, there is provided an optical disc manufacturing system for manufacturing a rewritable type optical disc, including: a manufacturing device for manufacturing an optical disc including recording tracks formed with break portions; and a recording device for forming recording marks corresponding to predetermined data on the recording tracks over the break portions.

In accordance with the manufacturing system thus configured, the recording tracks including the break portions are formed on the optical disc by the manufacturing device. Then, the recording marks are formed on the recording tracks at the positions over the break portions.

Preferably, the manufacturing device does not form the break portions on the recording tracks at positions where reading out the pre-pit is affected by the break portion. Thus, an error in reading out the pre-pit may be avoided.

According to still another aspect of the present invention, there is provided a method of manufacturing a rewritable type optical disc, including the steps of: manufacturing an optical disc including recording tracks formed with break portions; and forming recording marks corresponding to predetermined data on the recording tracks over the break portions.

In accordance with the above manufacturing method, the recording tracks including the break portions are formed on the optical disc by the manufacturing device. Then, the recording marks are formed on the recording tracks at the positions over the break portions.

Preferably, the break portions are not formed on the recording tracks at positions where reading out the pre-pit is affected by the break portion. Thus, an error in reading out the pre-pit may be avoided.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 4 is a chart showing the process of manufacturing are writable type optical disc according to the present invention.

FIGS. 5A and 5B are timing charts showing the read out timing of the data pre-recorded on the control data zone of a rewritable type optical disc according to the present invention.

DETAILED DESCRIPTION OF THE PREFERRED EMBODIMENTS

The preferred embodiments of the present invention will now be described below with reference to the attached drawings.

Figure 1:
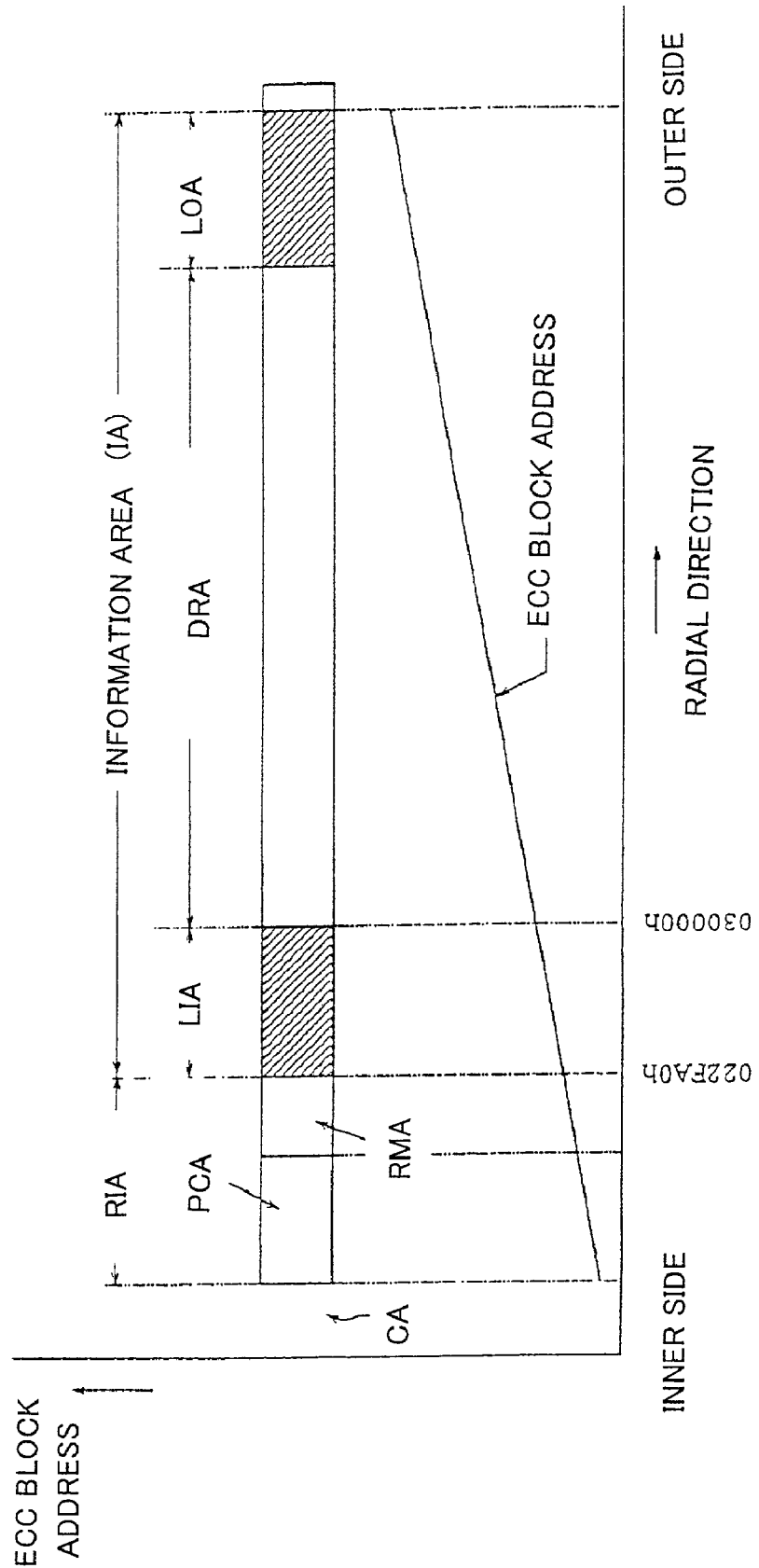
FIG. 1 is a diagram schematically showing data structure of DVD.
Figure 3:
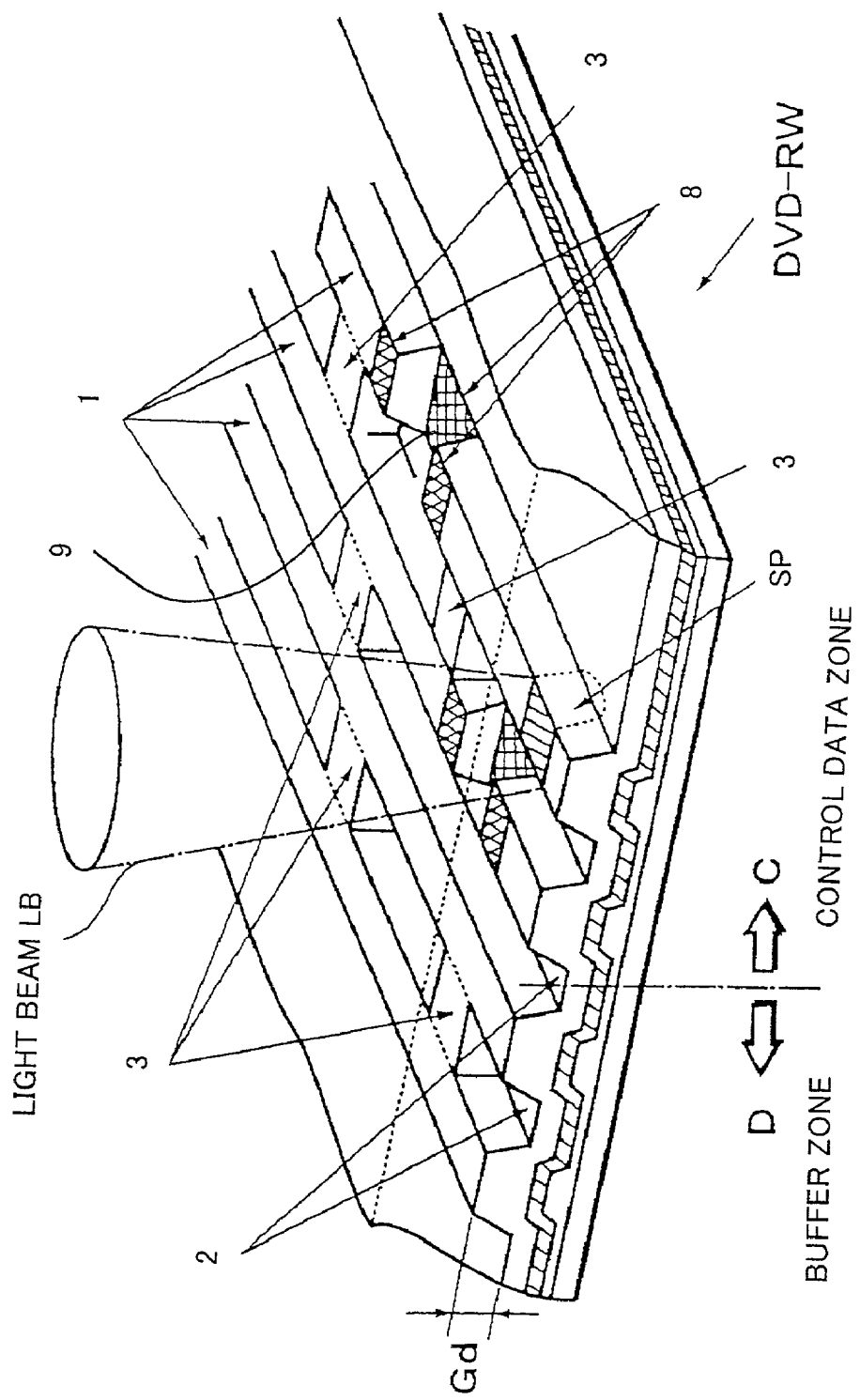
FIG. 3 is a perspective view showing the configuration of a rewritable type optical disc according to the present invention.

FIG. 1 shows the data structure of a DVD-RW on which video information is recorded in conformity with the DVD-RW standard, and FIG. 3 shows the physical configuration of a rewritable type optical disc according to the present invention. As shown in FIGS. 1 and 3, on this disc, a clamping area CA is formed at the center of the disc, and the groove tracks 1 and the land tracks 2 are spirally formed around the clamping area CA. In order to define the physical address on the disc, the groove tracks 1 and the land tracks 2 are formed in a wobbling manner and the land pre-pits 3 are formed on the land track 2.

Recording information on the groove tracks 1 (i.e., data writing) and reproducing information from the groove tracks 1 (i.e., data reading) are controlled such that a pickup device of an information recording/reproducing apparatus is positioned with respect to the wobbling groove tracks 1 and land tracks 2 based on the wobbling manner thereof and the information recorded as the land pre-pits 3. As shown in FIG. 1, the R-Information Area (RIA) and the Information area (IA) are allocated to the groove tracks 1, used for the data writing and the data reading, from the inner circumferential side (i.e., the side of the clamping area CA) to the outer circumferential side.

The R-Information area RIA includes a power calibration area (PCA) and a recording management area (RMA). The Information area IA includes a lead-in area (LIA), a data recording area (DRA) and a lead-out area (LOA). The data recording area DRA records various contents data such as audio data and video data (hereinafter referred to as "main data"), and file management information for managing the contents data as files.

The power calibration area PCA is used for the calibration of the quantity of the light beam from the pickup device. Namely, before the actual data recording by the information recording/reproducing apparatus, test writing and test reading are performed in the power calibration area PCA so as to determine an optimum light power for an appropriate recording condition. In the recording management area RMA, result data of the test recording performed in the power calibration area PCA is recorded.

In the lead-in area LIA, the recording management data indicating the physical information of the disc is recorded. The lead-out area LOA is formed at the end of the main data recorded in the data recording area DRA. In the lead-out area LOA, data "00h (h: hexadecimal)" is recorded. The beginning position of the lead-out area LOA changes dependently upon the data amount of the main data recorded in the data recording area DRA. The addresses of the areas PCA, RIA, LIA, DRA and the LOA, and the recording address of main data are set according to the ECC block address recorded in the form of the land pre-pits 3.

Figure 2:
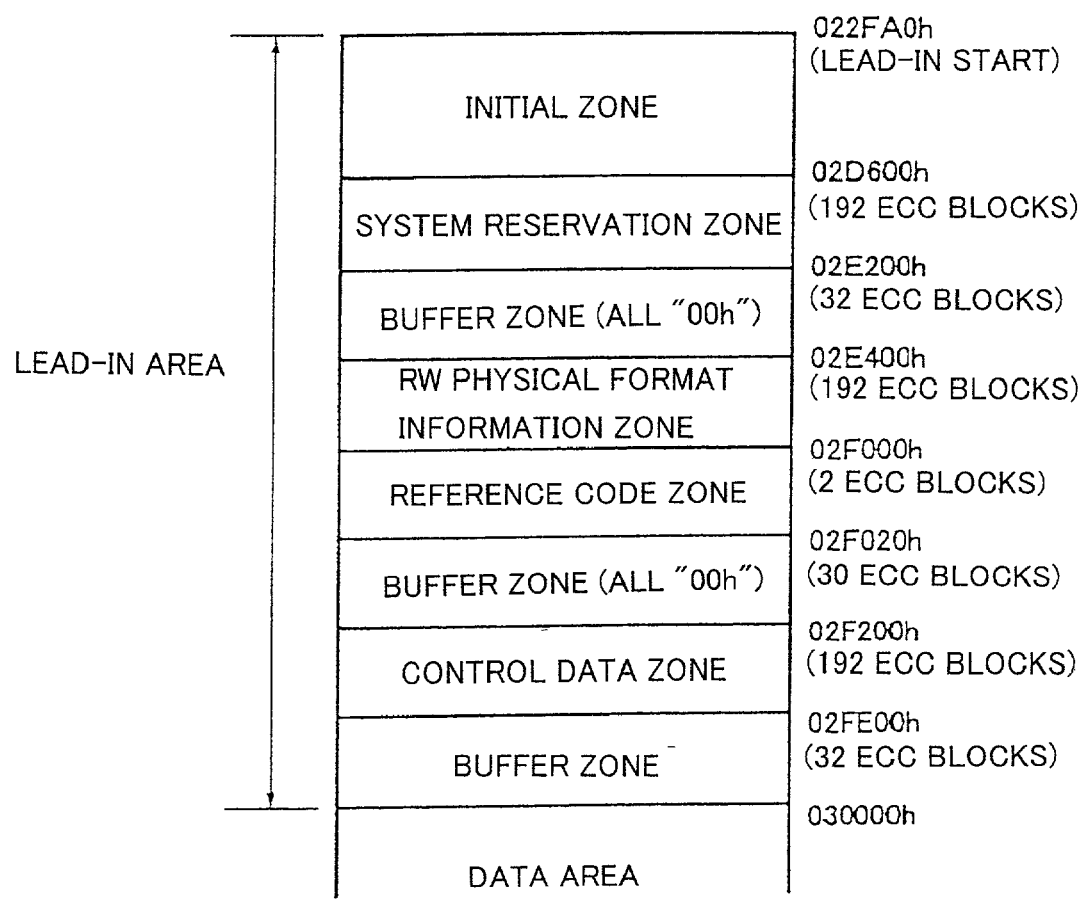
FIG. 2 shows the data structure in the lead-in area and the address allocation of DVD-RW.

FIG. 2 shows the data structure and an example of address allocation within the lead-in area LIA of DVD-RW. As shown in FIG. 2, from the start position "022FA0h" of the lead-in area LIA, the initial zone is formed. In the initial zone, data "00h" indicating the blank area is allocated. Following the initial zone, the system reservation zone of 192 ECC blocks, the buffer zone of 32 ECC blocks and having data "00h", and the RW physical format information zone of 192 ECC blocks are allocated. The RW physical format information zone will be described later in detail.

From the address "02F00h", the reference code zone of 2 ECC blocks is allocated. In the reference code zone, channel bit pattern (3T-6T-7T) is recorded, and code words in a conversion table defined in advance as the channel bit pattern are repeated. The information recording/reproducing apparatus is set such that the predetermined code words are read out correctly, i.e., within predetermined allowable error ratio. Following the reference code zone, the buffer zone having data of "00h" is allocated from the address "02F020h" for 30 ECC blocks.

The control data zone beginning from the address "02F200h" continues for 192 ECC blocks. In the control data zone, the control data of 16 sectors (1 ECC block) is repeatedly recorded for 192 times. The control data includes a physical format information area (1 sector), a disc manufacturing information area (1 sector) and a blank information area (14 sectors). As the physical format information, the type and part version of the DVD standard applied to the disc, the disc size, the minimum readout rate, the disc configuration (single-layer ROM disc, single-layer RAM disc, double-layer ROM disc or double-layer RAM disc), the recording density, the data area allocation, the linear velocity condition for the exposure amount designation at the time of recording in the burst cutting area, the readout power, the peak power, the bias power and various information relating to the manufacturing of the medium are recorded. In addition, in the blank information area, important information such as copyright protection information is recorded in an arbitrary position. Following the control data zone, the buffer zone having data "00h" is provided. The data recording area PRA follows the buffer zone.

The control data zone of 192 ECC blocks corresponds to the control data zone of the DVD-Video. So, in order to prevent the illegal copy of recorded contents data from a DVD-Video to a DVD-RW, it is necessary to prevent the illegal alteration of the control data recorded therein. The DVD-RW recorder reads out the control data from the control data zone, and if the control data is altered at the time of recording, the DVD-RW recorder records the altered control data within the RW-physical format information recoding zone so as to maintain the compatibility. Namely, the control data recorded in the control data zone is for the read-out use only.

FIG. 3 is a perspective view of a rewritable type optical disc, i.e., DVD-RW in this example, according to the present invention. In FIG. 3, the arrow C indicates the control data zone, and the arrow D indicates the buffer zone.

In DVD-RW, land pre-pit system is adopted for the track format, and information is recorded by irradiating the light beam onto the groove track 1. Namely, the land tracks 2 are formed on both sides of the groove track 1. The recording apparatus detects the land pre-pits 3 formed on the land tracks 2, serving as the guide track, to generate physical sector number of the groove track 1, and records information on the groove track 1 based on the sector number thus generated. In the present invention, it is characterized that the groove track 1 has break portions 9 in the control data zone. As seen in FIG. 3, the groove track 1 is discontinuous at the break portions. The break portion 9 is formed at the position corresponding to the center of the recording mark 8 of the control data. In other words, each recording marks 8 of the control data is recorded to cover the break portion 9. On the other hand, the groove track 1 is formed continuously and has no such break portion in the zones (e.g., the buffer zone D) other than the control data zone.

Figure 7:
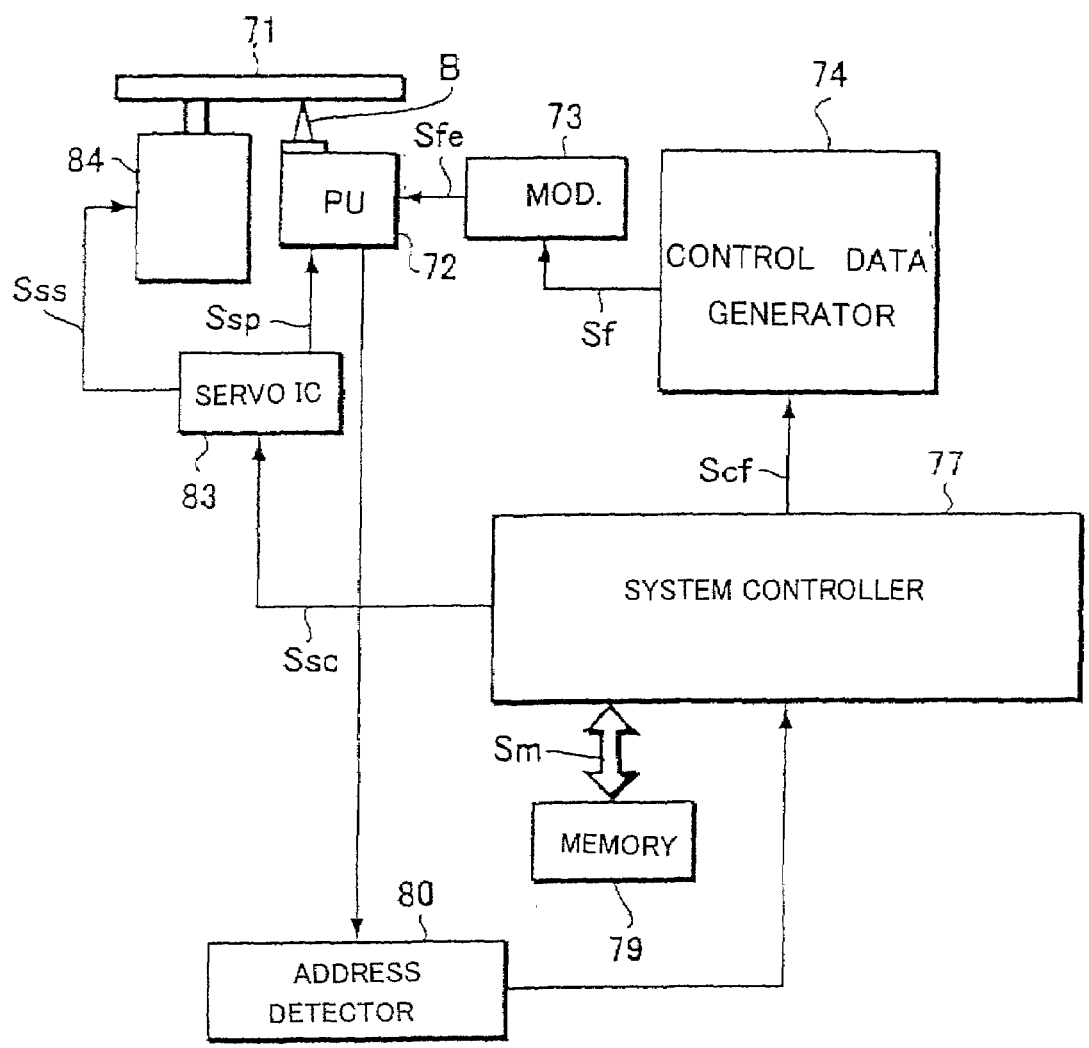
FIG. 7 is a block diagram showing a recording device used for the pre-recording process.
Figure 8A:
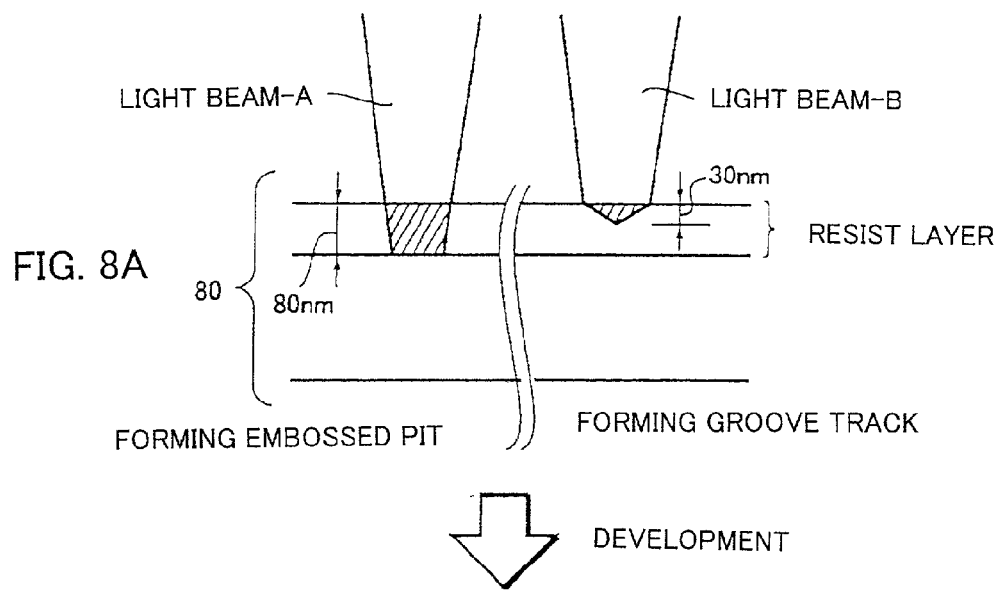
FIGS. 8A to 8C are explanatory diagrams showing how a groove shape is degraded due to formation of readable embossed pits.
Figure 8B:
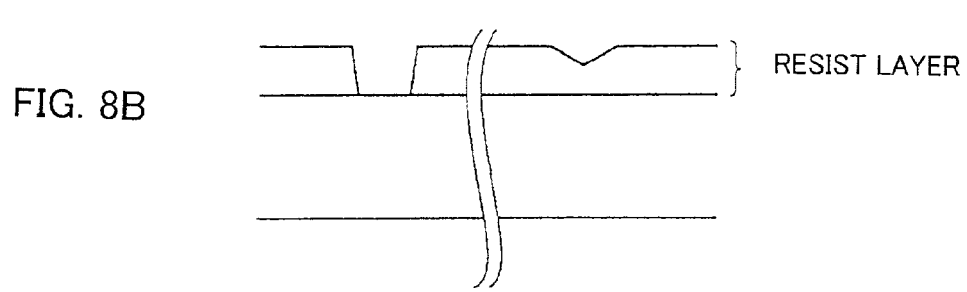
Figure 8C:
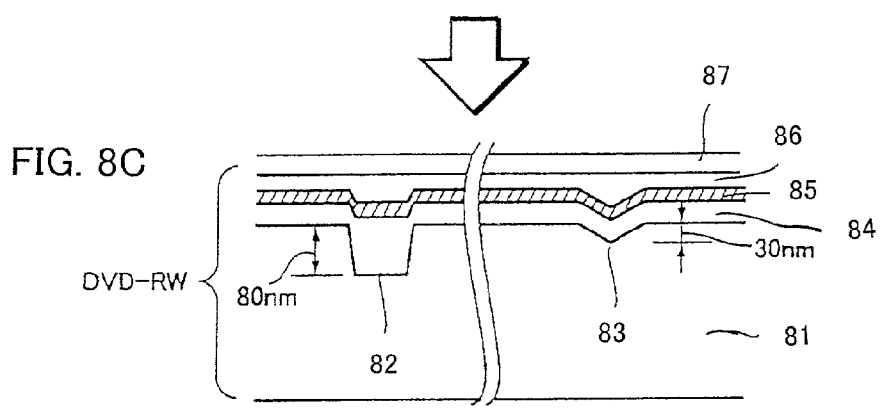

It is noted that FIG. 3 shows the surface of the disc in an upside-down state, and hence the groove track 1 is shown as protruding upwardly and the land track 2 is shown as recessed portion. The names "groove track" and "land track" expresses the track shapes of the disc in a normal use as shown in FIG. 7.

FIG. 4 shows a manufacturing method of the above-mentioned DVD-RW. As shown in FIG. 4, the manufacturing method includes a manufacturing process and a pre-recording process. The manufacturing process includes the laser cutting step S41, the developing step S42, the stamper producing step S43, and the replication step S44. Specifically, first, the light beam LB is irradiated on the resist surface 46 on the glass substrate 45 of the original recording disc to expose the resist surface to the depth of the upper surface of the glass substrate 45 (step S41), and then the original recording disc is developed (step S42). Then, the master stamper 47 is produced from the original recording disc thus developed (step S43). Then, the mass production of DVD-RW according to the present invention is performed according to a known replication process by using the master stamper 47 (step S44). Thus, optical discs according to the present invention are manufactured. In the optical disc of the present invention thus manufactured, the recording tracks have the break portions at the position corresponding to the center of each recording marks of the control data in the control data area.

Subsequently, in the pre-recording process, the light beam LB is irradiated on the groove tracks 1 to cover the break portions 9 so that the predetermined recording marks of control data are formed on the groove tracks 1 at the positions of the break portions 9 (step S45). In this way, manufacturing of the DVD-RW according to the present invention is completed.

It is noted that the land pre-pits 3 indicating the address position of the DVD-RW disc are also formed in the manufacturing process. However, it is important to note that the break portion 9 is not formed on the groove track 1 and the groove track 1 is continuously formed, if forming the break portion 9 disables or adversely effects the readout of the land pre-pits 3.

FIGS. 5A and 5B are timing charts illustrating the readout timing of the recording marks pre-recorded in the control data zone of the rewritable type optical disc according to the present invention. FIG. 5A illustrates the variation of the (digital) RF signal before and after pre-recording the recording marks, and FIG. 5B illustrates the variation of the RF signal when the illegal data is recorded.

In FIG. 5A, the control data signal, the groove data, the continuity and discontinuity of the groove track (i.e., break portions), the RF signal before pre-recording the recording mark, the pre-recorded recording marks and the RF signal after the pre-recording are shown. As shown in FIG. 5A, when the control data to be recorded in the control data zone includes a 3T recording mark, a 4T space, a 5T recording mark, a 3T space, a 4T recording mark and a 6T space in this order, the groove data is obtained by changing the level of the control data at the first and the last 1T from high level to low level, and then inverting the resultant data. Specifically, the groove data is produced by calculating the logical sum (AND) of a signal obtained by proceeding the control data by 1T and a signal obtained by delaying the control data by 1T, and then inverting the logical sum. The groove track is formed based on the groove data. Namely, the groove is formed when the groove data is at HIGH level, and the groove is not formed (i.e., break portion is formed) when the groove data is at LOW level.

Importantly, as shown by the dot line, the break portion 9 is not formed on the groove track 1 (i.e., the groove track is continuously formed) at the position X at which the break portion of the groove track 1 can adversely affect the readout of the land pre-pit 3 (LPP). The RF signal obtained by reproducing the groove track including the break portions takes the maximum level during the break portions of the groove track, and takes the level lower than the break portion during period when the groove track is formed. By the pre-recording process, the control data is recorded in synchronism with the break portions of the groove track, and the respective recording marks (3T, 5R, 4T, . . . ) of the control data cover the break portion of the groove track, respectively. Since the break portions of the groove track is shorter than the respective recording marks, the recording mark can cover the break portion correctly even if the position of the control data recorded as the recording mark is somewhat shifted. The RF signal obtained by reproducing the groove track after the pre-recording process goes down to the ground level during the period in which the recording marks are recorded, and hence the break portions formed on the groove track do not give any adverse effect on the reproduced RF signal.

FIG. 5B shows the variation of the reproduced RF signal when illegally altered control data is recorded on the control data zone. FIG. 5B shows the illegally recorded data, the position of the illegally recorded data on the groove track and the reproduced RF signal after the illegal control data is recorded. If the control data is illegally altered as shown in FIG. 5B, since the reproduced RF signal is affected by the break portion of the groove track, the noise Y is detected during the break portion and the noise Y prevent the illegally recorded data from being reproduced. Thus, if a user illegally alters the control data, e.g., copy protection data to produce illegal copy of the optical disc, the illegally recorded control data cannot be correctly read out. Thus, the illegal copy of the original disc can be avoided.

Figure 6:
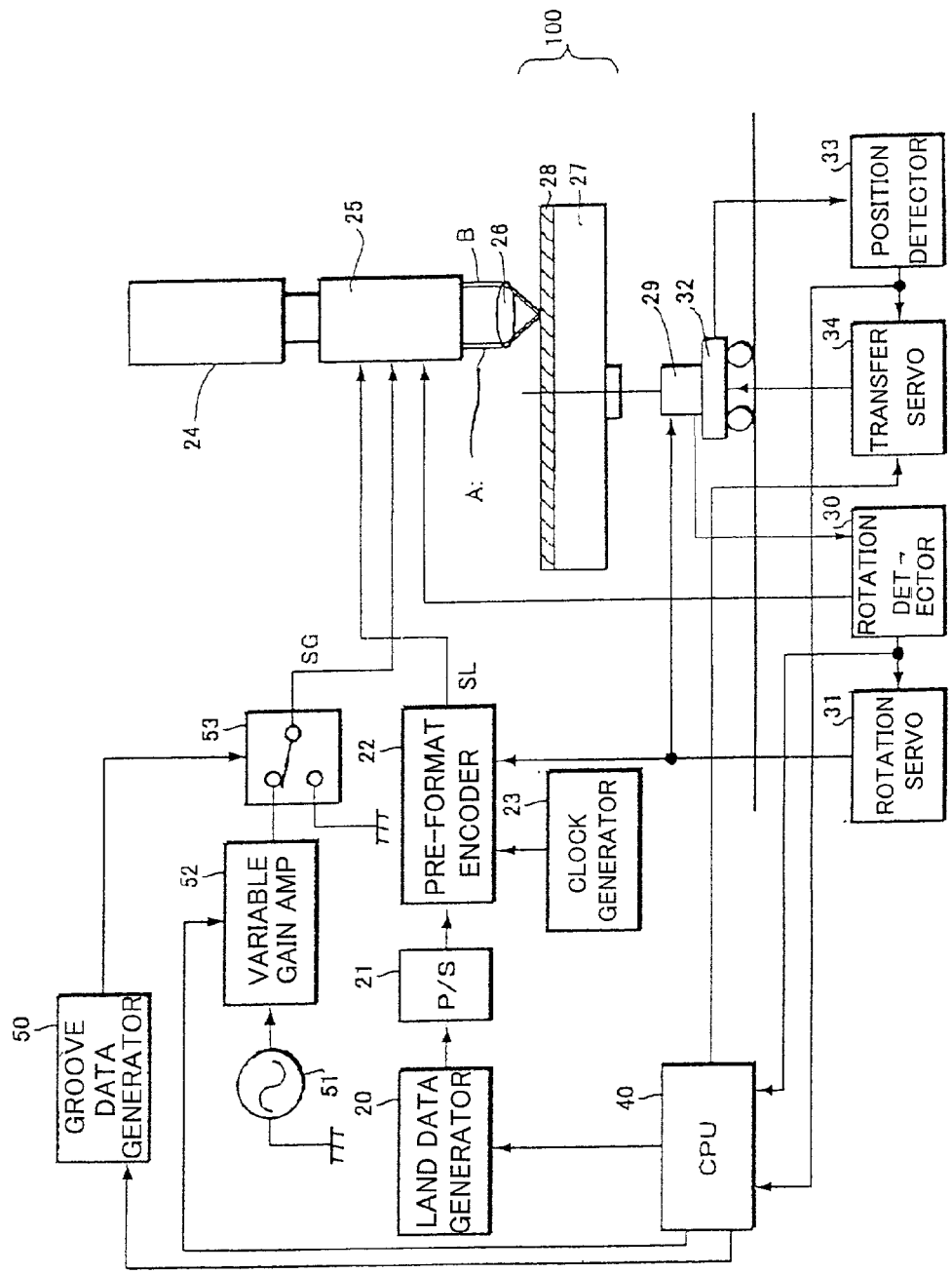
FIG. 6 shows a configuration of a manufacturing system of a rewritable type optical disc according to the present invention.

According to the present invention, a rewritable type optical disc is manufactured by the disc manufacturing system shown in FIGS. 6 and 7. The disc manufacturing system includes a manufacturing device and a recording device. The manufacturing device is shown in FIG. 6, and the recording device is shown in FIG. 7. The manufacturing device manufactures rewritable type optical discs having a recording track which includes break portions corresponding to the recording marks of predetermined data. The recording device records predetermined data on the groove tracks by using the light beam such that the recording marks of the predetermined data covers the break portions.

In FIG. 6, the high power laser generating device 24 generates a laser beam. The light modulator 25 modulates a light beam A for groove formation by the groove forming signal supplied from the groove data generator 50 via the switch 53 under the control of the CPU 40. Also, the light modulator 25 modulates a light beam B for land pre-pit formation by the pre-pit forming signal supplied from the land data generator 20 via the shift register 21 and the pre-format encoder 22 under the control of the CPU 40. Thereafter, the objective lens 26 condenses the light beam A or B to form a spot on the resist 28 of the original optical disc 100.

The manufacturing device forms the pre-pits on the optical disc between the neighboring groove tracks. However, as mentioned above, if the break portion gives adverse effect on the readout of the pre-pits, the manufacturing device forms the groove track in a continuous manner, without break portion.

The original optical disc 100 having the glass substrate 27 and the resist 28 is set to the spindle motor 29. The spindle motor 29 is rotated at a constant linear velocity by the rotation detector 30 and the rotation servo device 31. Further, the spindle motor 29 can be transferred in the radial direction of the original optical disc 100 by the transfer unit 32. By moving the transfer unit 32 in the radial direction of the original optical disc at a predetermined transferring speed by the position detector 33 and the transferring serve unit 34, the groove tracks and the land tracks are formed on the resist 28 on the glass substrate 27 in a spiral manner from the disc center to the outer circumference of the disc.

FIG. 7 shows a configuration of the recording device which is used for the pre-recording process. The recording device detects the address on the DVD-RW, which is rotated by the spindle motor 84, from the output signal of the pickup 72, and records the predetermined recording marks to cover the break portions of the groove track within the control data zone. This control is performed by the CPU in the system controller 77 which reads out and executes the program stored in the memory 79. Namely, the system controller 77 controls the control data generating circuit 74 under the control according to the program, and controls the modulator 73 based on the recording data generated by the control data generating circuit 74. Thus, the pickup 72 records the recording marks at the appropriate positions on the DVD-RW 71.

As described above, according to the present invention, in order to avoid illegal data alteration in a rewritable type optical disc on which predetermined data such as control data is recorded on the recording tracks, the recording track is formed with break portions at the positions corresponding to the center of the respective recording marks for the predetermined data. In addition, the recording marks of the predetermined data are recorded on the recording track so as to cover the break portions by means of the light beam. By this, it becomes unnecessary to form the deep embossed pits, and thus the degradation of the pit shape can be avoided. It is noted that the break portion is not formed and the recording track is continuously formed if forming the break portion adversely affects the readout of the pre-pits.

Further, according to the present invention, since the recording marks of the predetermined data is recorded to cover the break portions of the groove track, the radial push-pull signal can be correctly obtained in the control data zone in the same manner as the case where the recording data is continuously recorded on the groove track, even if the groove track has the break portions.

It is noted that the present invention is not limited to the specific embodiment described above. For example, in the above embodiment, the break portion is formed at the center portion of the respective recording mark other than the 1T periods at the beginning and the end of the recording mark as shown in FIG. 5A. However, the amount "1T" is determined in consideration of the recording position accuracy of the recording mark during the pre-recording process, and the amount is not limited to 1T. For example, when the recording position accuracy of the recording device is satisfactory, the amount 1T may be reduced and the length of the break portion may be longer. This further enhances the effect of avoiding the readout of illegally altered control data.

On the other hand, when the recording position accuracy of the recording device is not good, the amount may be longer and the break portion may be shortened. Further, while the effect of avoiding the readout of the illegally recorded data is lowered, the length of the break portion of the groove track maybe constant irrespective of the length of the respective recording marks.

According to the above embodiments, the present invention is applied to the DVD-RW. However, it is apparent that the present invention is applicable to other various rewritable type optical discs. Further, while it is described that the control data can be protected from illegal alteration, the above-mentioned "predetermined data" may be other data than the control data.

As described above, according to the present invention, it becomes unnecessary to form deep embossed pits, and the groove shape deterioration may be avoided. Therefore, the control data can be read out without the degradation of the recording/reproduction characteristics of the groove track. Furthermore, according to the present invention, the existing manufacturing facility of rewritable type optical disc can be used for manufacturing the disc according to the present invention.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Applications No. 2000-334967 filed on Nov. 1, 2000 including the specification, claims, drawings and summary is incorporated herein by reference in its entirety.

What is claimed is:

1. A rewritable type optical disc comprising:
   recording tracks formed with break portions, each break portion being a discontinuous portion of the recording track; and
   recording marks corresponding to predetermined data and formed on the recording tracks, wherein a recording mark covers a break portion and the break portion is shorter than the recording mark, and further comprising pre-pits formed between neighboring recording tracks and indicating an address position on the optical disc, wherein the break portions are not formed on the recording tracks at positions where reading out the pre-pit is affected by the break portion.

2. A rewritable type optical disc according to claim 1, wherein the break portions are not formed on the recording tracks at positions where the break portion is in alignment with the pre-pit in a radial direction of the optical disc.

3. A rewritable type optical disc according to claim 1, wherein the breaks portions are not formed on the recording tracks at portion where the break portion and the pre-pit are close to each other within a range of a light beam spot used for reading out data from the optical disc.

4. A rewritable type optical disc according to claim 1, wherein the break portions are positions at center portions of the recording marks.

5. A rewritable type optical disc comprising:
   recording tracks formed with break portions, each break portion being a discontinuous portion of the recording track; and
   recording marks corresponding to predetermined data and formed on the recording tracks, wherein a recording mark covers a break portion and the break portion is shorter than the recording mark,
   wherein the predetermined data is control data to be recorded in a control data zone of the optical disc, and the break portions are formed on the recording tracks only in the control data zone.

6. A rewritable type optical disc according to claim 5, wherein the break portions are positioned at center portions of the recording marks.

7. An optical disc manufacturing system for manufacturing a rewritable type optical disc, comprising:
   a manufacturing device for manufacturing an optical disc comprising recording tracks formed with break portions, each break portion being a discontinuous portion of the recording track; and
   a recording device for forming each of recording marks corresponding to predetermined data on the recording tracks such that a recording mark covers a break portion and the break portion is shorter than the recording mark,
   wherein the optical disc further comprises pre-pits between neighboring recording tracks, and wherein the manufacturing device does not form the break portions on the recording tracks at positions where reading out the pre-pit is affected by the break portion.

8. An optical disc manufacturing system according to claim 7, wherein the break portions are positioned at center portions of the recording marks.

9. An optical disc manufacturing system for manufacturing a rewritable type optical disc, comprising:
   a manufacturing device for manufacturing an optical disc comprising recording tracks formed with break portions, each portion being a discontinuous portion of the recording track; and
   a recording device for forming each of recording marks corresponding to predetermined data on the recording tracks suck that a recording mark covers a break portion and the break portion is shorter than the recording mark,
   wherein the predetermined data is control data to be recorded in a control data zone of the optical disc, and manufacturing device forms the break portions on the recording tracks only in the control data zone.

10. An optical disc manufacturing system according to claim 9, wherein the break portions are positioned at center portions of the recording marks.

11. A method of manufacturing a rewritable type optical disc, comprising the steps of:
    manufacturing an optical disc including recording tracks formed with break portions, each break portion being a discontinuous portion of the recording track; and
    forming each of recording marks corresponding to predetermined data on the recording tracks such that a recording mark covers a break portion and the break portion is shorter than the recording mark,
    wherein the optical disc further comprises pre-pits between neighboring recording tracks, and wherein the break portions are not formed on the recording tracks at positions where reading out the pre-pit is affected by the break portion.

12. A method of manufacturing a rewritable type optical disc according to claim 11, wherein the break portions are positioned at center portions of the recording marks.

13. A method of manufacturing a rewritable type optical disc, comprising the steps of:
    manufacturing an optical disc including recording tracks formed with break portions, each break portion being a discontinuous portion of the portion of the recording track; and
    forming each of recording marks corresponding to predetermined data on the recording tracks such that a recording mark covers a break portion and the break portion is shorter than the recording mark,
    wherein the predetermined data is control data to be recorded in a control data zone of the optical disc, and the break portions are formed on the recording tracks only in the control zone.

14. A method of manufacturing a rewritable type optical disc according to claim 13, wherein the break portions are positioned at center portions of the recording marks.

* * * * *